Oct. 10, 1933.  J. W. TREW ET AL  1,930,374
EDGE GUARD
Filed Jan. 17, 1933  4 Sheets-Sheet 1
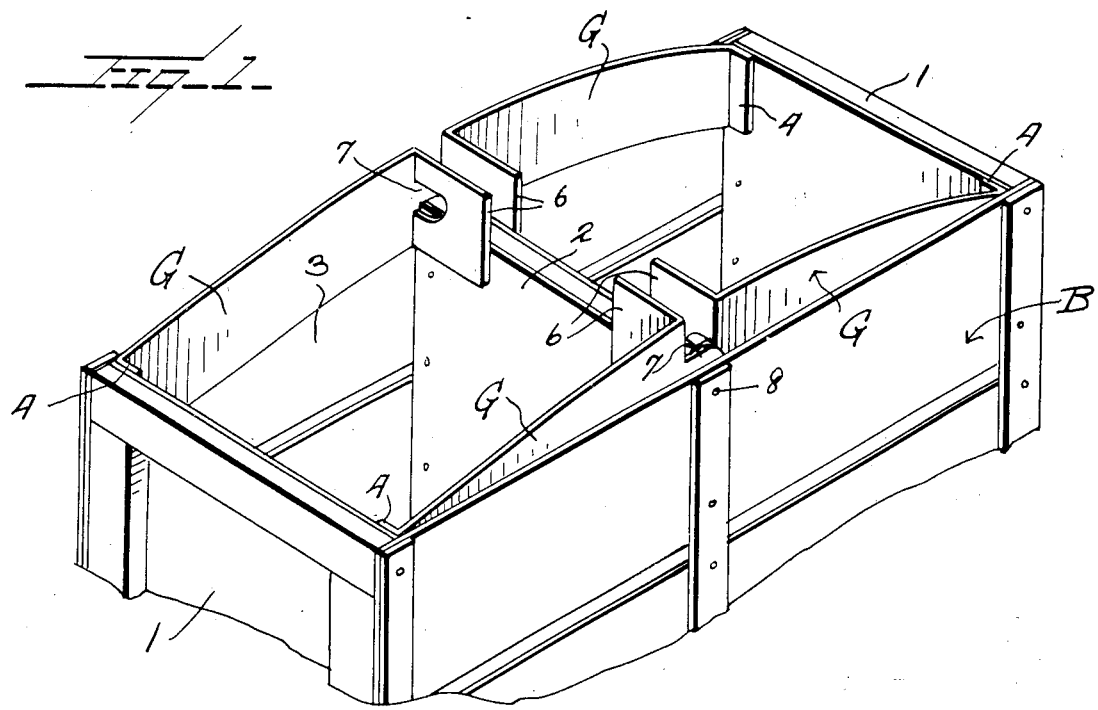
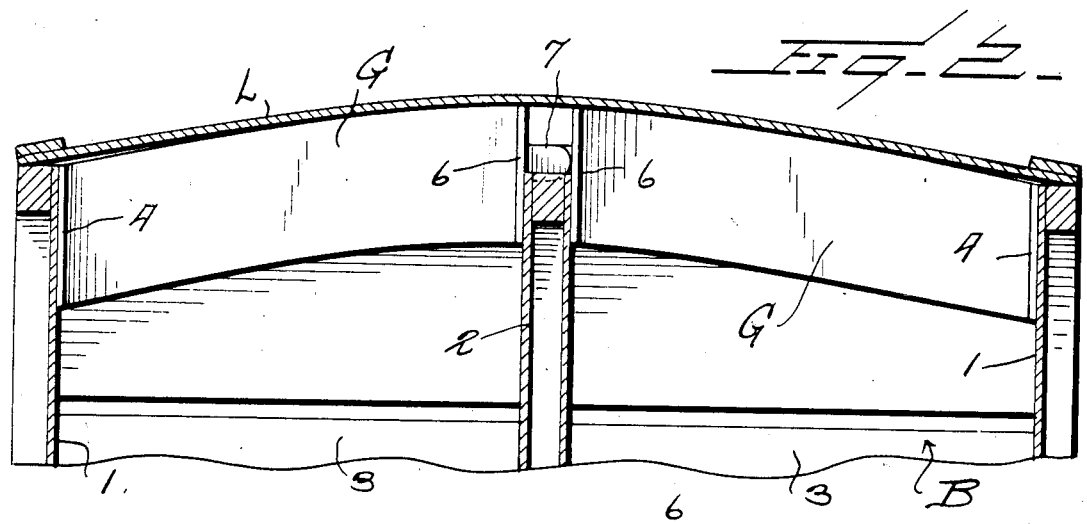
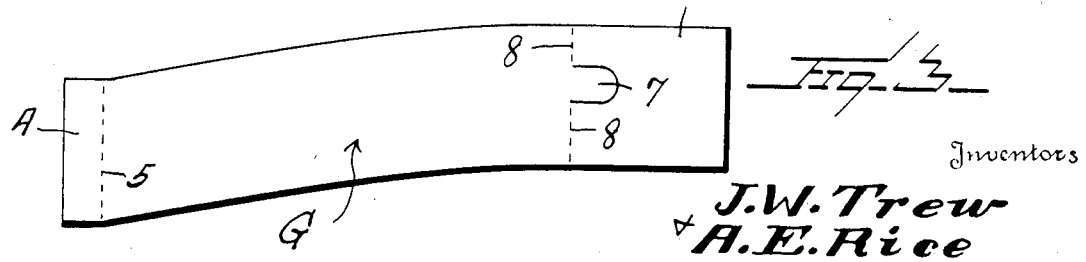
Inventors
J. W. Trew
& A. E. Rice
By Watson E. Coleman
Attorney Oct. 10, 1933.  J. W. TREW ET AL  1,930,374
EDGE GUARD
Filed Jan. 17, 1933   4 Sheets-Sheet 2
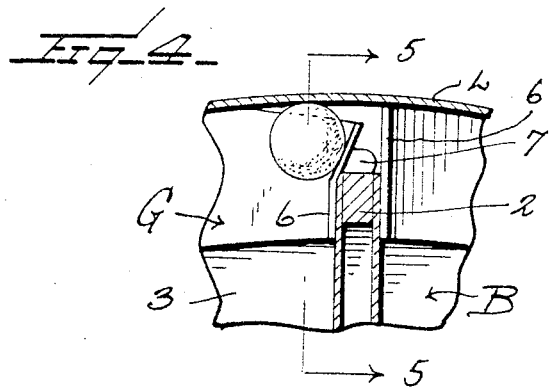
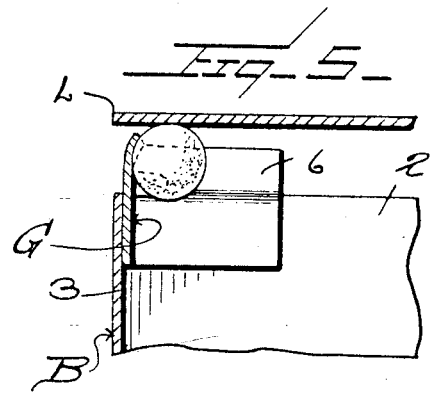
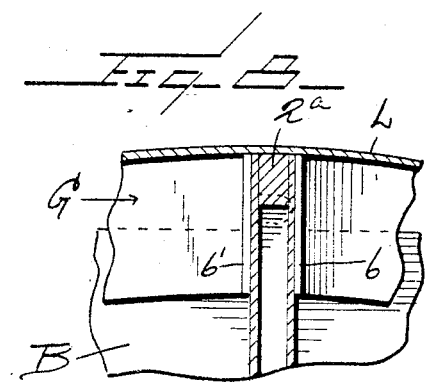
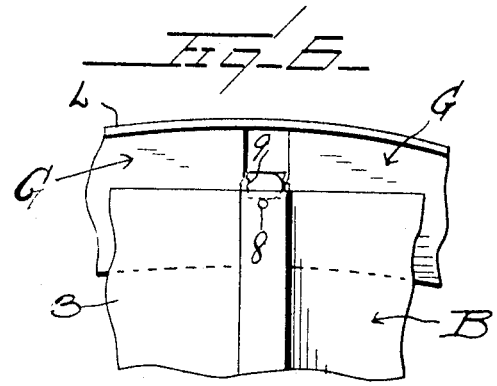
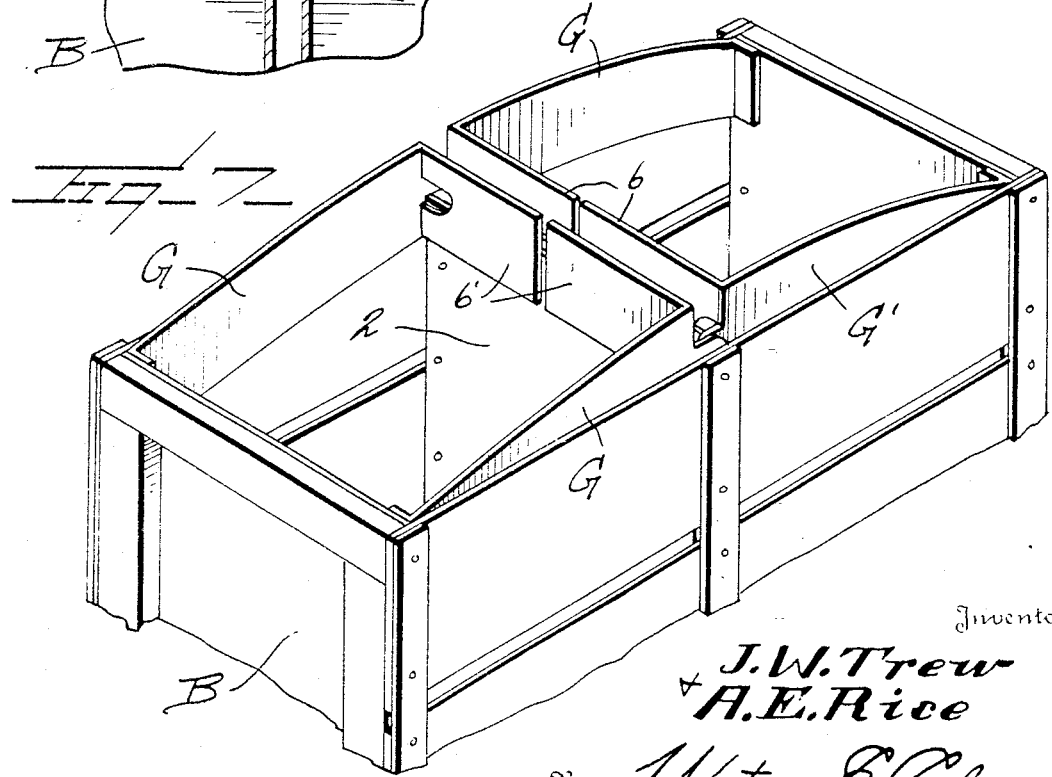
Inventors
J. W. Trew
A. E. Rice
By Watson E. Coleman
Attorney Oct. 10, 1933.    J. W. TREW ET AL    1,930,374
EDGE GUARD
Filed Jan. 17, 1933    4 Sheets-Sheet 3
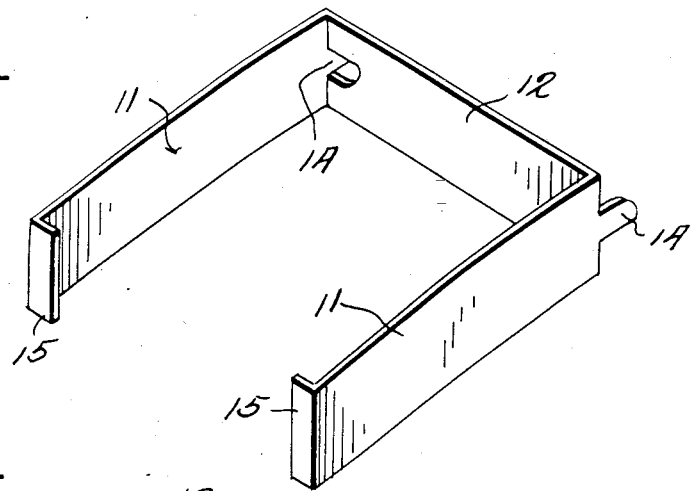
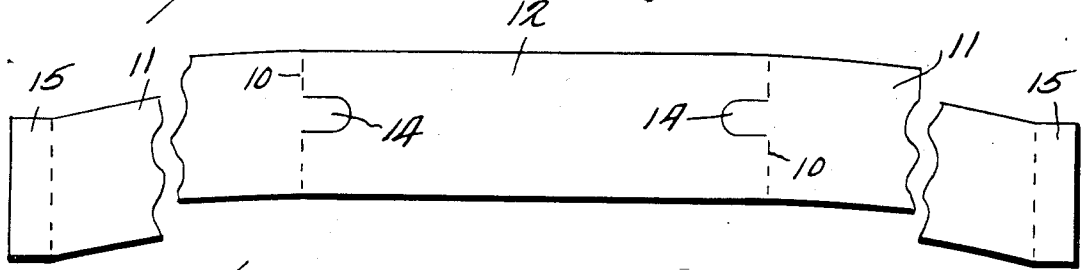
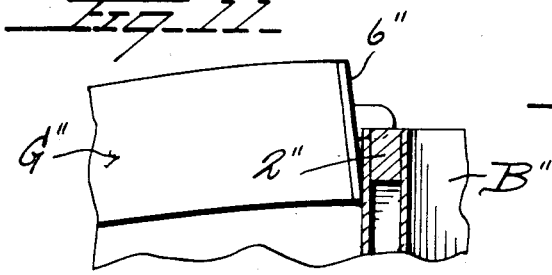
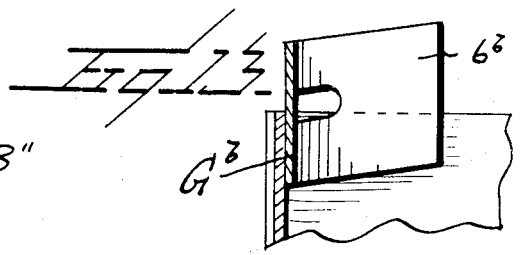
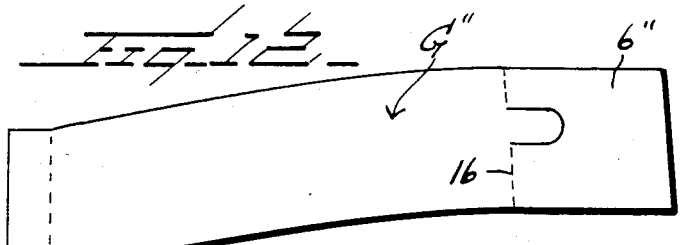
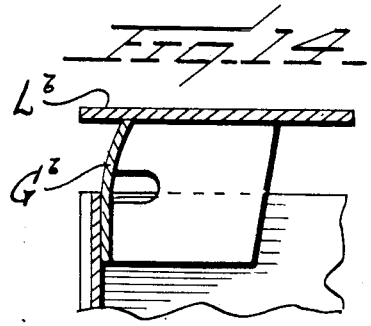
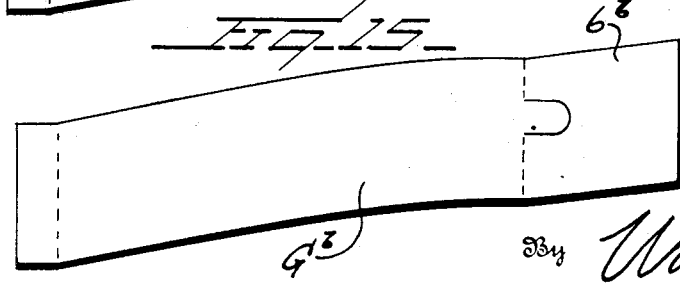
Inventors
J. W. Trew
& A. E. Rice
By Watson E. Coleman
Attorney

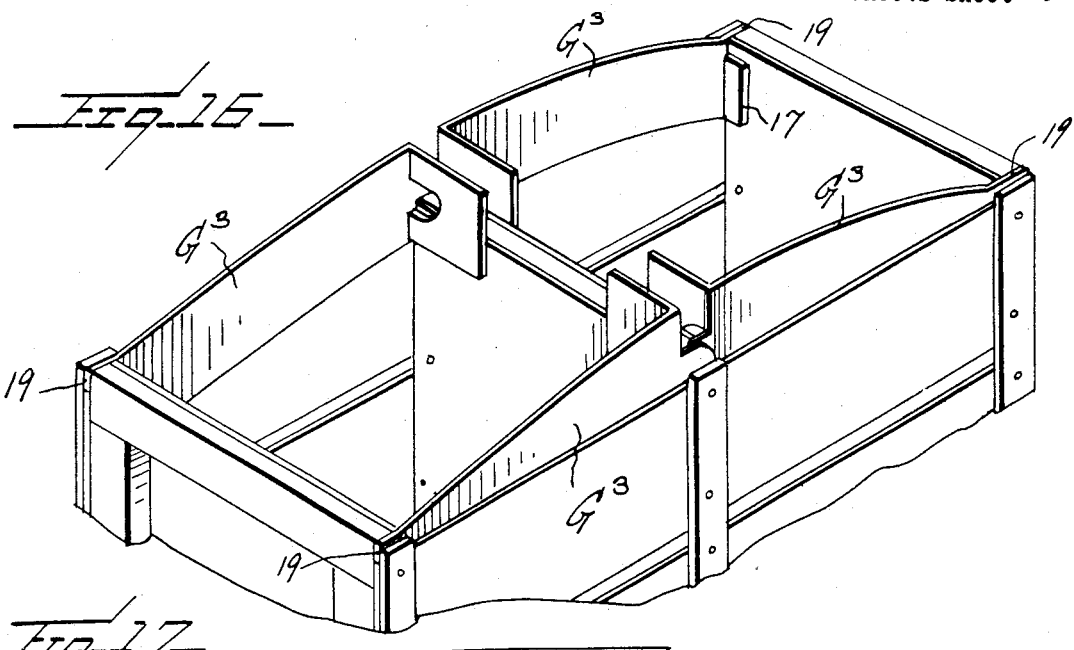
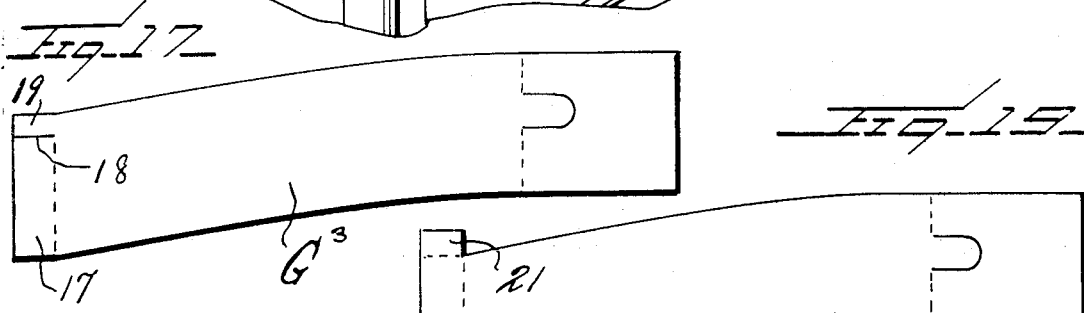
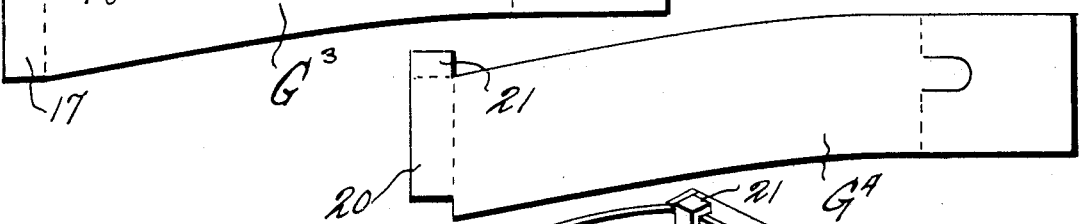
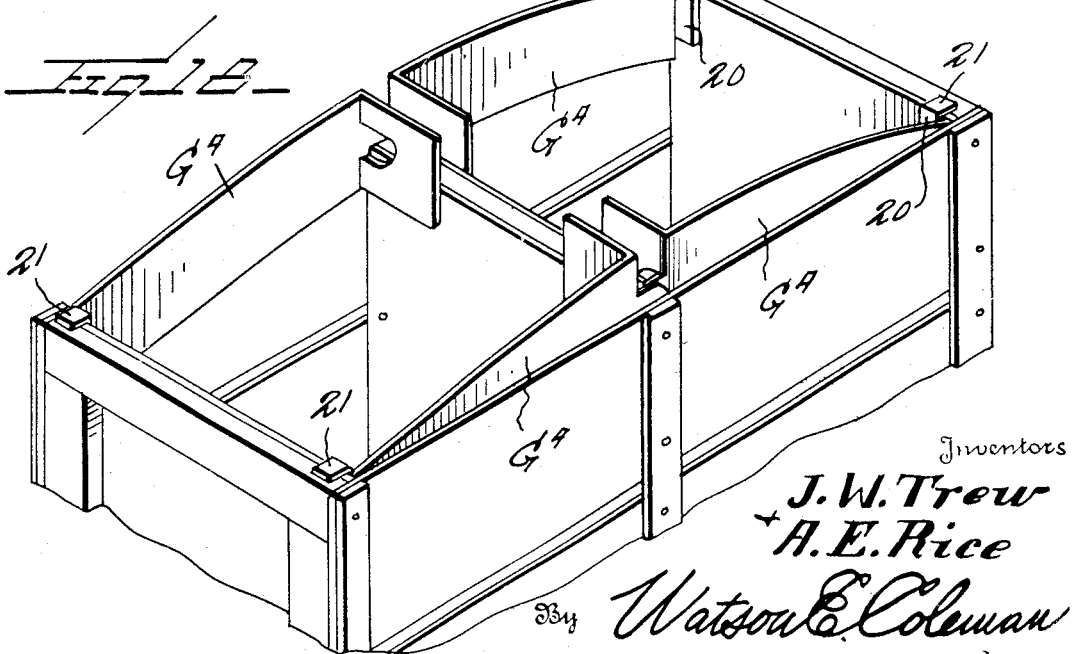

Patented Oct. 10, 1933

1,930,374

UNITED STATES PATENT OFFICE 1,930,374

EDGE GUARD

James W. Trew, Gettysburg, and Arthur E. Rice, Biglerville, Pa., assignors to Rice, Trew & Rice Co. Inc., Biglerville, Pa., a corporation of Pennsylvania Application January 17, 1933. Serial No. 652,232

18 Claims. (Cl. 217—3)

This invention relates to guards, and it is an object of the invention to provide a device of this kind particularly designed and adapted for use in connection with a fruit package comprising a box and a lid and wherein the guard serves to prevent injury to the fruit upon application of the lid and also to avoid loss of the fruit and more particularly the fruit of the top layer of the package between the applied lid and a side of the box or kindred container.

Another object of the invention is to provide a guard of this kind having means adapted to be arranged between adjacent parts of a box structure for facilitating the initial application of the guard in working position but which means does not interfere with any downward movement of the guard into the box and particularly any downward pressure created at the time the box lid is being applied.

It is also an object of the invention to provide a guard of this kind adapted to be disposed along a side of a box or kindred container and above the upper edge of said side, said guard at one extremity having means adapted to be acted upon during the application of the box lid whereby the pressure created upon the box content serves to exert lateral pull upon a portion of the guard inwardly of the box or container thus effectively assuring against loss of fruit between the side wall of the box and the lid.

An additional object of the invention is to provide a guard to be applied along the upper edge portion of a side wall of a fruit box and extending substantially from approximately an end wall of the box to an intermediate transverse wall or partition with means to extend between said intermediate wall and the side wall to facilitate the initial application of the guard to the box.

The invention consists in the details of construction and in the combination and arrangement of the several parts of our improved guard whereby certain important advantages are attained and the device rendered simpler, less expensive and otherwise more convenient and advantageous for use, as will be hereinafter more fully set forth.

The novel feature of our invention will hereinafter be definitely claimed.

In order that our invention may be the better understood, we will now proceed to describe the same with reference to the accompanying drawings, wherein:—

Figure 1 is a fragmentary view in perspective of a box having applied thereto guards constructed in accordance with an embodiment of our invention;

Figure 2 is a longitudinal vertical sectional view taken through Figure 1 at substantially the transverse center thereof;

Figure 3 is a view in plan of one of the guards as disclosed in Figure 1 in flattened or blank form;

Figure 4 is a fragmentary detail sectional view with portions in elevation illustrating the action of a portion of the box content upon the applied guard as a result of the application of the box lid;

Figure 5 is a fragmentary detailed sectional view taken substantially on the line 5—5 of Figure 4;

Figure 6 is a detailed view in side elevation illustrating the tabs of the guards torn or broken free of the guards proper so that no hindrance will be offered thereby to downward movement of the guards as the lid for the box is applied;

Figure 7 is a view in perspective illustrating guards constructed in accordance with another embodiment of our invention;

Figure 8 is a fragmentary view partly in longitudinal section and partly in elevation illustrating guards constructed in accordance with our invention applied to a type of box wherein the intermediate or central transverse wall or partition extends a pronounced distance above the side walls of the box;

Figure 9 is a view in perspective of a guard constructed in accordance with a further embodiment of our invention and folded for application to a box;

Figure 10 is a view in plan of the guard as comprised in Figure 9 in flattened or blank form, portions being broken away;

Figure 11 is a fragmentary view partly in section and partly in elevation illustrating a still further embodiment of our invention;

Figure 12 is a view in plan of the guard as comprised in Figure 11 in flattened or blank form;

Figure 13 is a fragmentary view partly in section and partly in elevation illustrating a guard embodying another form of our invention;

Figure 14 is a view partly in section and partly in elevation showing the form of guard as illustrated in Figure 13 with the box lid applied, the line of section being at right angles to that in Figure 13;

Figure 15 is a view in top plan of the guard as illustrated in Figures 13 and 14 in flattened or blank form;

Figure 16 is a view in perspective illustrating guards constructed in accordance with an additional embodiment of our invention;

Figure 17 is a view in plan of the guard as illustrated in Figure 16 in flattened or blank form;

Figure 18 is a view in perspective of a still further embodiment of our invention;

Figure 19 is a view in plan of the guard as illustrated in Figure 18 in flattened or blank form.

In the embodiment of our invention as particularly illustrated in Figures 1, 2, 3, 4, 5 and 6, the guard G is disposed along the upper marginal portion of each side wall of a box compartment B and of a length to extend substantially from an end wall 1 of the box to the central or intermediate transverse wall 2. The guard G comprises a band of relatively heavy paper stock, such as cardboard or other material capable of being used for the purpose desired.

The band is disposed lengthwise on a predetermined curvature and particularly at the upper or outer marginal portion thereof so as to approximately conform to the maximum bulge of the top layer of fruit packed within the box or container B thus assuring an effective bridging of the space between the applied lid L and the side wall 3 of the box B with which the guard G is associated. The guard or band G is also quite broad so that when it is initially applied in position it will extend a considerable distance within the upper portion of the box so that the pressure from within of the box content, or more particularly an upper layer of the fruit, will coact with the lower portion of the applied guard or band G to hold the applied guard or band against the adjacent side wall 3 and thereby facilitate the maintenance of the guard or band in applied position.

The outer end of the guard G or that end which is adjacent to an end wall 1 when the guard is applied, is provided with a flap 4, said flap being separated from the guard or band proper by a scored line 5. The scored line 5 is on such angle or bias with respect to the longitudinal axis of the guard or band G proper to assure, when the flap 4 is inwardly disposed with respect to the box B, close contact of the flap 4 with an adjacent end wall 1 of the box B. This flap 4 is of a length to extend below the applied lid L whereby the outer end of the guard or band G when in working position is held against upward movement. The opposite end portion of the band or guard G is provided with a second and comparatively longer flap 6 from which however is cut or struck a tab 7.

This tab 7 is integral with the band or guard G proper and its line of juncture with the band or guard is in alignment with the scored lines 8 at opposite sides of the tab 7 and which lines separate the flap 6 from the guard or band G. The flap 6 when the guard or band is applied is also disposed in a direction inwardly of the box B and has contact with the upper portion of a face of the intermediate or central wall or partition 2.

When the lid L is applied the pressure imposed upon the top layer of fruit by the lid L will cause the upper outer corner portion of the flap 6 to bend or flex over the upper edge of the intermediate partition or wall 2 as illustrated in Figure 4 and at the same time pull inward the adjacent upper end portion of the guard or band G proper. This is highly important as this bending or flexing of the end portion of the guard or band G with the accompanying pull or strain further assures any of the fruit in the top layer from passing outwardly beyond the adjacent side wall 3 of the box and thus preventing loss of fruit through the space between the applied lid and the upper marginal edge of a box side and also to a further minimize bruising or injury of the fruit.

As the flap 6 is forced outwardly and over the upper edge of the intermediate transverse wall 2, said portion of the flap also protects the contacting fruit against being injured by this intermediate wall 2.

When a guard G is applied the tab 7, which remains substantially coplanar with the body portion of the guard or band proper, is received in the space between an end edge of the intermediate wall 2 and a side wall 3 of the box. It is believed to be obvious that this space between an edge of the intermediate wall 2 and a side wall 3 of the box provides what may be clearly termed an "opening" facing away from or extending toward the bottom of the box and while the general assembly of fruit boxes may result in the production of such an opening it is believed obvious that such an opening may be otherwise produced as the occasions of practice may necessitate.

With the box structure substantially tight the frictional contact of a tab 7 between an end edge face of the wall 2 and a side wall 3 serves as a means to hold the end portion of the guard G in initial applied position but does not interfere with any downward movement of the guard as pressure is imposed upon the upper edge of the guard during the application of the lid L. In fact, it is desired that the initially applied guard G have unlimited downward movement within the box B and particularly as created by the pressure of the lid L on the guard. By providing for this unlimited downward movement of the guard variation in spacing between an applied lid and the upper edge of a side wall 3 is easily compensated for and, furthermore, the use of the guard G is materially facilitated when employed in connection with a box B', as illustrated in Figure 8, wherein the upper portion of the intermediate or central wall or partition 2ª is extended a pronounced distance above the top edges of the side walls of the box B'. Should a tab 7 as it is forced downwardly between an end edge of a central or intermediate wall 2 or 2ª come into contact with any obstruction, such as a holding nail 8, said nail will readily cut into or through the tab or said tab will readily tear off as indicated at 9 in Figure 6 of the accompanying drawings. The tab 7 does not at any time have such contact or engagement with the central or intermediate wall or partition 2 to limit the downward movement of the guard with respect to the box B.

It may occur that a nail 8 may be so positioned to limit the downward movement of the guard G when first applied but this nail will offer no hindrance to the downward movement of the guard G under the influence of the pressure created during the application of the lid L.

In the embodiment of our invention as particularly illustrated in Figures 1, 3 and 5 the flap 6 is of a length to extend only a comparatively short distance inwardly of the intermediate wall or partition 2 although if desired, as illustrated in Figure 7 of the accompanying drawings, each of the guards G' may have a flap 6' of a length to be disposed substantially half way across said intermediate wall or partition 2'.

It has also been found in practice of advantage to have the lower marginal portion of the tab 7 at substantially the transverse center of the guard or band G although of course we do not desire to be limited to this particular location.

In the embodiment of our invention as illustrated in Figures 9 and 10 of the accompanying drawings, the guard comprises an elongated band of material divided as illustrated in Figure 10 by the scored lines 10 into the side members 11 and the intermediate member 12. In this embodiment of our invention the guard when applied is substantially U-shaped in form with the side members 11 disposed along the upper marginal portions of the sides of the box and of course extending thereabove a distance sufficient to bridge the spaces between said side walls of the box and the side marginal portions of the applied lid.

The opposite end portions of the intermediate member 12 have cut or struck therefrom the tabs 14 which are adapted to be received between the end edges of the intermediate transverse wall or partition of a fruit box and the side walls in the same manner and for the same purpose as the tabs 7 hereinbefore referred to.

The outer or free end portions of the side members 11 are also provided with the inwardly disposed flaps 15 for the same purpose as the flap 4 hereinbefore particularly mentioned.

In the embodiment of our invention as particularly illustrated in Figures 11 and 12 the guard G'' is constructed in substantially the same manner as the guard G hereinbefore referred to except that the flap 6'', which is intended for coaction with the upper marginal portion of the intermediate transverse wall or partition of the fruit box, is separated from the band or guard G' by a scored line 16 disposed on an angle to the longitudinal axis of the band or guard G'' proper so that, as illustrated in Figure 11, when the guard or band G' is initially applied within a box B'' the flap 6'' will be disposed on an upward and inward incline with respect to the adjacent associated intermediate transverse wall 2''. By this structure as the upper layer of fruit is pressed against the flap 6'' and particularly as the lid is being applied, the desired effective inward bending or flexing of the adjacent upper marginal portion of the band or guard G' is assured.

In the embodiment of our invention as particularly illustrated in Figures 13, 14 and 15 the flap 6$^b$ of the guard or band G$^b$ is disposed on a slightly upward incline with respect to the longitudinal axis of the guard or band G$^b$ as is particularly illustrated in Figure 13. However, as the lid L$^b$ is applied the contact of said lid from above with the inner or free end portion of the flap 6$^b$ will assure the desired inward flexing of the adjacent upper marginal portion of the guard or band G$^b$.

The embodiment of our invention as illustrated in Figures 16 and 17 is substantially the same as that illustrated in Figures 1 to 6 inclusive except that the flap 17 at the outer end of the guard or band G$^3$ extends only partially across the guard or band G$^3$, the upper or end edge of the flap 17 being separated by a cut 18 whereby is provided an extending finger 19 to engage between an end wall and an adjacent side wall of the box.

In the structure as illustrated in Figures 18 and 19 the end flap 20 of the guard or band G$^4$ is provided with a supplemental flap 21 which initially is disposed beyond the upper edge of the guard or band G$^4$ and which when said guard or band G$^4$ is applied is adapted to be folded so as to engage from above an end wall of the box B as illustrated in Figure 18 of the drawings.

From the foregoing description it is thought to be obvious that a guard constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. As a new article of manufacture, a fruit guard comprising a band to be placed within a box to bridge the space between the upper edge of a side wall of the box and an applied lid, one end portion of the band being provided with a flap to be disposed inwardly of the box and to contact with a transverse wall of the box, said flap having cut therefrom a tab to be received between a side wall and transverse wall of the box.

2. As a new article of manufacture, a fruit guard comprising a band to be placed within a box to bridge the space between the upper edge of a side wall of the box and an applied lid, one end portion of the band being provided with a flap to be disposed inwardly of the box and to contact with a transverse wall of the box, said flap having cut therefrom a tab to be received between a side wall and transverse wall of the box, said tab being at all times substantially coplanar with the band.

3. In combination, a container having a transverse wall and an opening adjacent to an end of the transverse wall and facing away from the bottom of the container, a lid for the container, a portion of said lid being spaced from the container when the lid is applied, a guard member bridging the space between the top of the container and the lid, and means on said guard member slidably engaged within the opening.

4. In combination, a container having a transverse wall and an opening adjacent to an end of the transverse wall and facing away from the bottom of the container, a lid for the container, a portion of said lid being spaced from the container when the lid is applied, a guard member bridging the space between the top of the container and the lid, and means on said guard member freely engaged within the opening to allow the guard member to move toward the bottom of the container.

5. In combination, a container having a transverse wall and an opening adjacent to an end of the transverse wall and facing away from the bottom of the container, a lid for the container, a portion of said lid being spaced from the container when the lid is applied, a guard member bridging the space between the top of the container and the lid, and a tab extending from the guard member and slidably engaged within the opening.

6. A guard for a container having a transverse wall with an opening adjacent to the juncture between the transverse wall and a side wall of the container and extending toward the bottom of the container, said guard comprising a flat band to engage the interior of a side wall, said band having a means to freely engage within the said opening to allow the band to move toward the bottom of the container.

7. A guard for a container having a transverse wall with an opening adjacent to the juncture between the transverse wall and a side wall of the container and extending toward the bottom of the container, said guard comprising a flat band to engage the interior of a side wall, and means to freely engage within the said opening to allow the band to move toward the bottom of the container.

8. A guard for a container having a transverse wall with an opening adjacent to the juncture between the transverse wall and a side wall of the container and extending toward the bottom of the container, said guard comprising a flat band to engage the interior of a side wall, and a means at an end portion of said band to freely engage within the said opening to allow the band to move toward the bottom of the container.

9. A guard for a container having a transverse wall with an opening adjacent to the juncture between the transverse wall and a side wall of the container and extending toward the bottom of the container, said guard comprising a flat band to engage the interior of a side wall, and a tab extending from said band to freely engage within the said opening to allow the band to move toward the bottom of the container.

10. A fruit guard comprising a band adapted to be arranged along the upper inner portion of a side wall of a container to extend above said side wall to bridge the space between the upper edge of said side wall and an applied lid, and means on the band to extend inwardly of the container and exposed for contact with the lid to flex inwardly the upper marginal portion of the band.

11. A fruit guard comprising a band adapted to be arranged along the upper inner portion of a side wall of a container to extend above said side wall to bridge the space between the upper edge of said side wall and an applied lid, and means on the band to extend inwardly of the container and exposed for contact with the lid to flex inwardly the upper marginal portion of the band at an extremity thereof.

12. A fruit guard comprising a band adapted to be arranged along the upper inner portion of a side wall of a container to extend above said side wall to bridge the space between the upper edge of said side wall and an applied lid, and a flap carried by the band to extend inwardly of the container and exposed for contact with the lid to flex inwardly the upper marginal portion of the band.

13. A fruit guard comprising a band adapted to be arranged along the upper inner portion of a side wall of a container to extend above said side wall to bridge the space between the upper edge of said side wall and an applied lid, and a flap carried by the band to extend inwardly of the container and exposed for contact with the lid to flex inwardly the upepr marginal portion of the band, said band having a score line disposed thereacross at the juncture of the flap and band, said score line being on an angle with respect to the longitudinal axis of the band.

14. A fruit guard comprising a band adapted to be arranged along the upper inner portion of a side wall of a container to extend above said side wall to bridge the space between the upper edge of said side wall and an applied lid, and a flap carried by the band to extend inwardly of the container and exposed for contact with the lid to flex inwardly the upper marginal portion of the band, said band having a score line disposed thereacross at the juncture of the flap and band, said score line being on an angle with respect to the longitudinal axis of the band, the score line being on an angle to cause the flap to be disposed upwardly when the flap is turned to a position to extend inwardly of the container.

15. A fruit guard comprising a band adapted to be arranged along the upper inner portion of a side wall of a container to extend above said side wall to bridge the space between the upper edge of said side wall and an applied lid, and means on the band to extend inwardly of the container and exposed for contact with the lid to flex inwardly the upper marginal portion of the band, the band being disposed lengthwise on a curvature.

16. A fruit guard comprising a band adapted to be arranged along the upper inner portion of a side wall of a container to extend above said side wall to bridge the space between the upper edge of said side wall and an applied lid, and a flap carried by the band to extend inwardly of the container and exposed for contact with the lid to flex inwardly the upper marginal portion of the band, said band being disposed lengthwise on a curvature, the high point of the curvature being adjacent to the flap.

17. A guard for a container having a transverse wall with openings adjacent to the junctures between the transverse wall and the side walls of the container, said openings facing away from the bottom of the container, the guard comprising a substantially U-shaped band, the side walls of the guard to engage the interior of the side walls of the container, and means carried by the side members of the guard to freely engage within the openings to allow the guard to move toward the bottom of the container.

18. A guard for a container having a transverse wall with openings adjacent to the junctures between the transverse wall and the side walls of the container, said openings facing away from the bottom of the container, the guard comprising a substantially U-shaped band, the side members of the guard to engage the interior of the side walls of the container, and means carried by the side members of the guard to freely engage within the openings to allow the guard to move toward the bottom of the container, said means being adjacent to the junctures between the side members and the intermediate member of the guard.

ARTHUR E. RICE.
JAMES W. TREW.